United States Patent [19]

In Albon

[11] Patent Number: 5,211,344
[45] Date of Patent: May 18, 1993

[54] COFFEE MILL

[75] Inventor: Jean-Paul In Albon, Ardon, Switzerland

[73] Assignee: Sistar SA, Sion, Switzerland

[21] Appl. No.: 885,288

[22] Filed: May 18, 1992

[30] Foreign Application Priority Data

May 17, 1991 [CH] Switzerland ............ 1486/91

[51] Int. Cl.$^5$ ................................ B02C 23/02
[52] U.S. Cl. .................... 241/100; 241/146
[58] Field of Search .............. 241/100, 162, 146

[56] References Cited

U.S. PATENT DOCUMENTS

| | | | |
|---|---|---|---|
| 221,707 | 11/1879 | Totman | 241/146 |
| 640,845 | 1/1900 | Webster | 241/146 |
| 1,692,162 | 11/1928 | Exsternbrink | 241/146 |
| 4,789,106 | 12/1988 | Weber | 241/101.2 |

FOREIGN PATENT DOCUMENTS

| | | |
|---|---|---|
| 0452214 | 10/1991 | European Pat. Off. . |
| 265119 | 4/1912 | Fed. Rep. of Germany ...... 241/146 |
| 2410122 | 9/1975 | Fed. Rep. of Germany . |
| 3429044 | 2/1986 | Fed. Rep. of Germany ...... 241/100 |
| 2074679 | 9/1971 | France . |

Primary Examiner—Mark Rosenbaum
Assistant Examiner—John M. Husar
Attorney, Agent, or Firm—Young & Thompson

[57] ABSTRACT

This invention relates to a coffee mill which comprises two grinding devices, each device being formed of a fixed annular grinder (1,1') and a rotary annular grinder (3,3') which are mounted in opposition the one to the other. The grinding devices are coaxially superposed. The rotary grinders (3,3') of the two devices are rotated by a single axle (5,5') connected to a single driving motor (M) with a double rotation direction, and the cutting means of one of the pairs of grinders are oriented for a right hand cutting, whereas those of the other pair of grinders are oriented for a lefthand cutting.

6 Claims, 2 Drawing Sheets

COFFEE MILL

FIELD OF THE INVENTION

The present invention relates to a coffee mill, more particularly suitable to be incorporated in an automatic coffee machine.

BACKGROUND OF THE INVENTION

It is already well known for grinding coffee to use a device which comprises two annular grinders mounted in opposition, one being fixed and the other being rotary, and in which the centrifugal force propels the ground coffee beans toward the periphery of the grinders where an opening is provided for recovering the coffee powder.

Almost all the modern automatic coffee machines comprise an integrated mill of the above-mentioned type. However, most of these machines are intended for working with two different kinds of coffee, the second kind being for example a caffeine free coffee. In this case, it is presently necessary to provide the coffee machine with two separated mills, that is for each with a feeding device, a body with annular grinders and a driving motor of the rotary grinder. This leads to the drawbacks on one part of necessitating a machine of larger sizes and on the other part of constituting a relatively expensive solution.

SUMMARY OF THE INVENTION

The purpose of this invention thus consists in providing a coffee mill or grinder which allows to realize a substantial saving in costs and more particularly to lead to a reduced bulk.

The coffee mill of the present invention, which aims to reach the above purpose, is characterized by the fact that it comprises two grinding devices, each device being formed of a fixed annular grinder and a rotary annular grinder which are mounted in opposition the one to the other, by the fact that both grinding devices are coaxially superposed, the rotary grinders of the two devices being rotated by a single axle connected to a single driving device with a double rotation direction, and by the fact that the cutting means of one of both pairs of grinders are oriented for a right hand cutting whereas those of the other pair of grinders are oriented for a left hand cutting.

BRIEF DESCRIPTION OF THE DRAWINGS

The annexed drawing shows schematically and by way of example an embodiment of the invention.

DETAILED DESCRIPTION OF THE INVENTION

Figure 1:
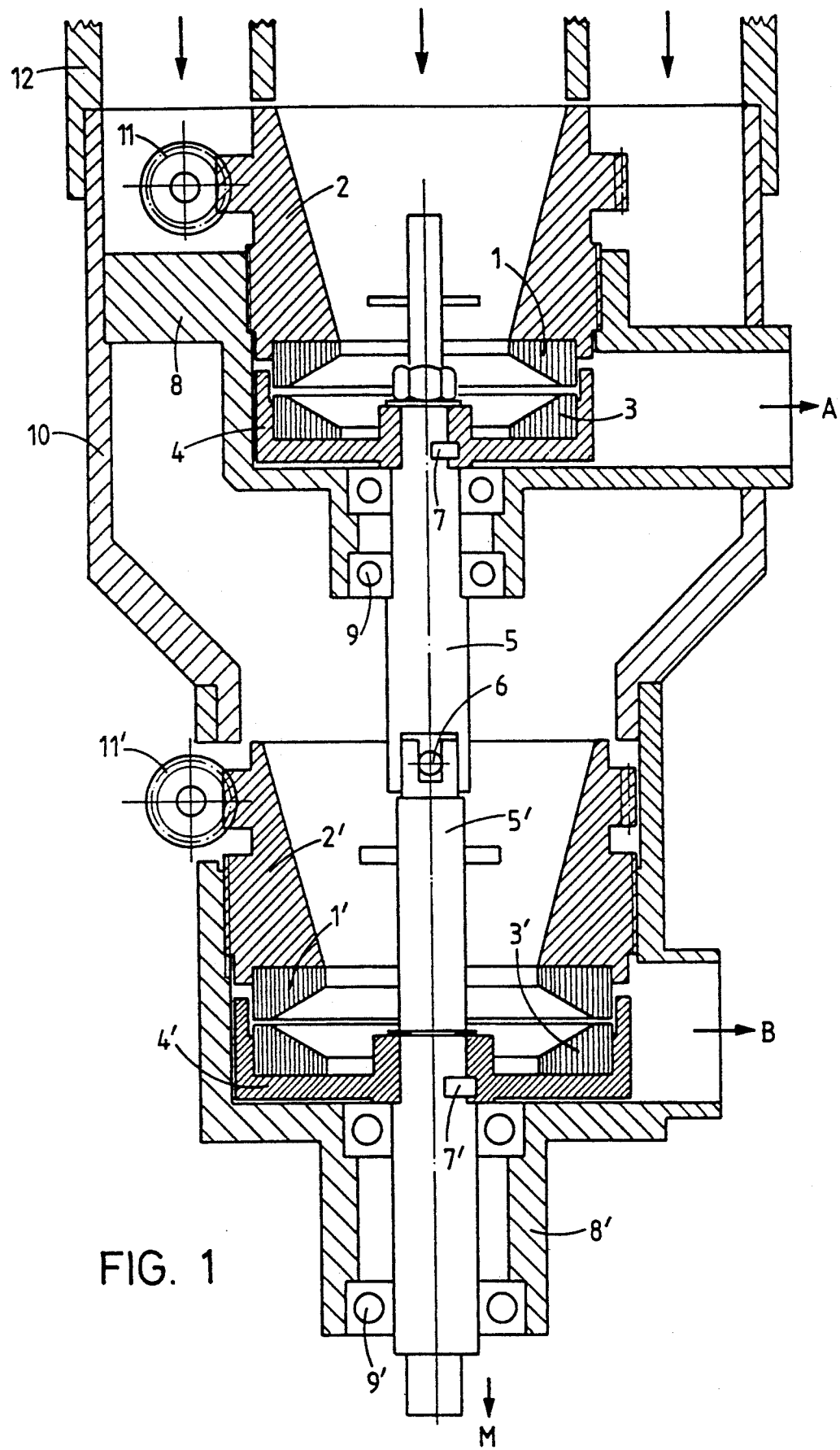
FIG. 1 is a vertical section view thereof.

The coffee mill according to the invention, as is shown by way of example on FIGS. 1 to 4, comprises in fact two mills of a known type which are vertically and coaxially superposed, each mill forming a stage of said mill according to the invention.

Each of the stages comprises an annular grinder 1,1' fixed in rotation and mounted on a grinder-holder 2,2' also fixed in rotation, as well as an annular rotary grinder 3,3' mounted on a grinder-holder also rotary 4,4'. The rotary grinders 3,3' are mounted in opposition, in a known manner, under the fixed grinders 1,1'. These grinders 1,1'; 3,3' are formed, also in a known manner, by a ring having a plane face and a conical face directed in an inclined manner towards the center; non radial slots forming cutting edges c,c' are provided in this conical face (see FIGS. 2A and 2B).

Figures 2A, 2B:
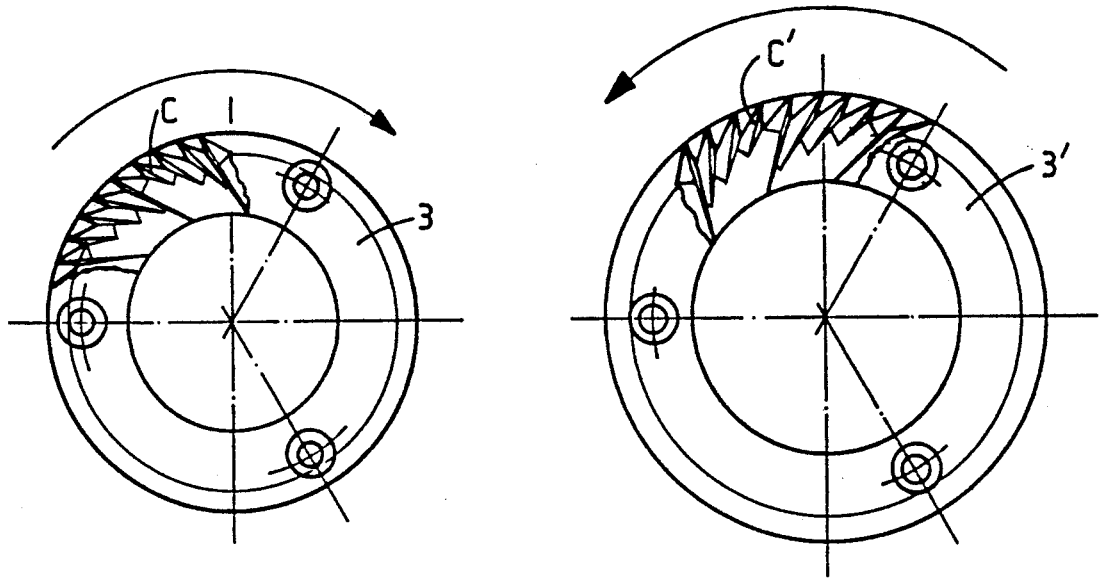
FIGS. 2a and 2b are partial plane views of the rotary grinders with right hand cutting of the first stage, respectively with left hand cutting of the second stage.

On the other hand, as shown also on FIGS. 2A and 2B, the rotary grinder 3 of the upper stage is appropriate for a right hand cutting, whereas the rotary grinder 3' is appropriate for a left hand cutting. Furthermore, as it can be noticed, the diameter of the grinders 3,4 of the upper stage is smaller than that of the grinders 3',4' of the lower stage of the coffee mill.

The rotation of the rotary grinders 3,3' is provided by two rotation axles 5,5', these axles being vertically aligned, connected by a coupling pin 6 and driven in rotation by one single motor M (not shown), preferably an electrical one. The rotary grinders holders 4,4' are radially fixed on the respective rotation axles 5,5' by means of driving pins 7,7'.

Each one of the two stages of the mill further comprises a body 8,8' in which the above described constituting elements are mounted, this body having a lateral outlet A,B and a vertical bearing for the rotation of the driving axle 5,5', this bearing being preferably formed of a ball bearing 9,9'.

Finally, the grinder holders fixed in rotation 2,2' are mounted in a vertically displaceable manner, by means of an adjustment endless screw 11,11'. This endless screw 11,11' can be actuated either manually or by means of a small electrical motor with electronic control, in order to adjust the height of the fixed grinder 2,2' with regards to the rotary grinder 3,3', and thereby the vertical gap separating the cutting edges of both grinders for determinating the granulometry of the ground coffee grains.

On the other hand, the bodies 8,8' of the two stages of the coffee mill are vertically assembled by an assembling body 10 forming with said stages bodies 8,8' the preferably cylindrical external wall of the mill according to the invention.

Figure 3:
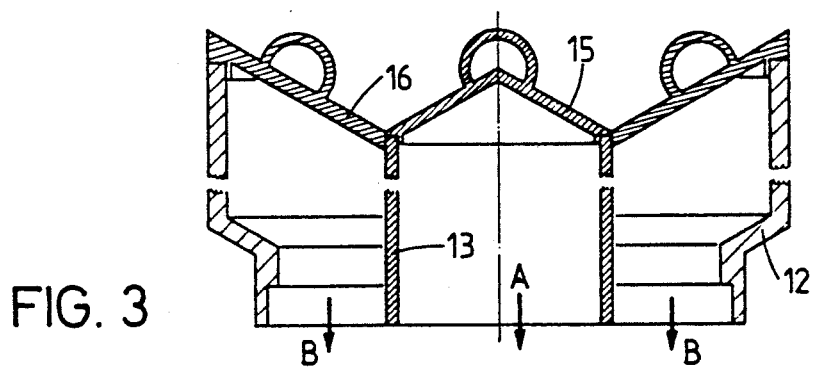
FIGS. 3 and 4 are views of the beans feeding container, respectively in vertical section and in plane.
Figure 4:
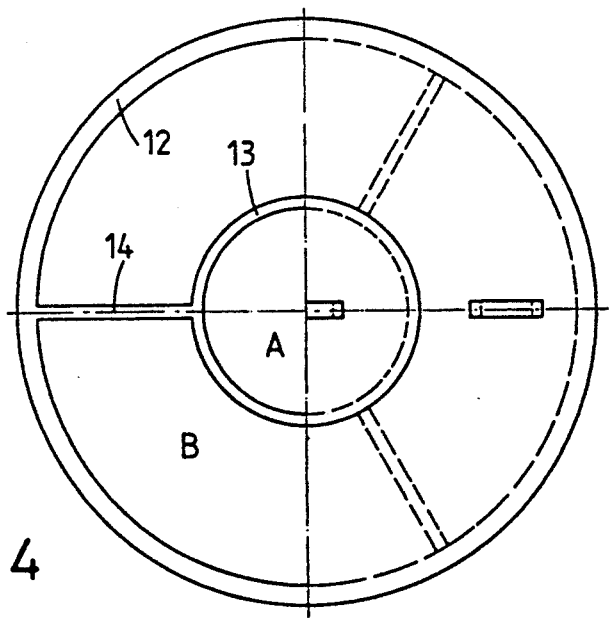

An embodiment of the beans feeding container 12 is represented on FIGS. 3 and 4, which is disposed in service position coaxially above the upper stage of the coffee mill of FIG. 1. This container, preferably in the form of a funnel, comprises a central separation tube 13 whose cylindrical internal space gives access to the grinders 3,4 of the upper stage. The annular space situated between the central tube 13 and the wall of the container 12 gives access to the grinders 3',4' of the lower stage of the coffee mill; this annular space is further vertically separated by separations walls 14 being useful to rigidify the container 12.

The access to the two compartments of the container 12 from the outside can be closed by covers respectively 15 and 16. The central cover 15 has a conical shape and the walls thereof allow, when it is in position, to easily pour the coffee beans to be ground into the annular portion giving access to the compartment B. Similarly, the cover 16 is ring-shaped, whose plane is radially inclined from top to bottom and towards the center of the container 12 in such a way that when it is in position it allows to be useful as a funnel to easily pour the coffee beans into the central compartment A.

With regards to the working of the double body or double stage coffee mill according to the invention, as it has just been described by reference to the annexed drawing, it is as follows.

The two different kinds of coffee beans are introduced into the two respective compartments of the container 12. The coffee beans which are introduced in the central part of the container 12 go down by gravity into the body 8 to reach the grinders 3,4 of the upper stage A, whereas those introduced in the external space of said container 12 go down by gravity through the linking body 10 to the body 8' for reaching the grinders 3',4' of the lower stage B of the coffee mill.

When the user wishes to grind the coffee beans corresponding to those introduced into the upper stage A of the mill, then he should start the motor M in such a manner that this rotates the driving axles 5,5' rightwards. Thereby, the rotary grinder 3 is rotated rightwards and becomes active for grinding the coffee beans in cooperation with the fixed grinder 1 of the same stage A, of course after adjustment of the granulometry wished by acting on the adjustment screw 11. The ground coffee is then carried towards the outside by the centrifugal force and is expelled through the outlet A towards a conduit or a recovering device (not shown).

On the other hand, the right hand rotation of the axles 5,5' will also drive the rotary grinder 3' of the lower stage B rightwards but taking account that the grinders 3',4' of this lower stage B are appropriate for a left hand cutting, this rightwards rotation of the grinder 3' will be without any effect on the coffee beans situated in the lower part of the mill, except for a slight upwards motion due to the air displacement because of the rotation.

Of course, when the user wishes to grind the coffee beans, corresponding to those introduced in the lower stage B of the mill, he merely needs to reverse the rotation motion for the motor M and thereby of the axles 5,5', making the grinders 3,4 inactive and the grinders 3',4' active.

It is thus possible with the mill according to the invention to put at the disposal of the user an apparatus which allows to grind to different kinds of coffee with only one motor by a simple inversion of the direction of rotation of said driving motor.

The coffee mill according to the invention can be realized in the form of a separated household apparatus; however, it is particularly advantageous for being integrated within an automatic coffee machine, this thanks to its small bulk due to the presence of two mill bodies axially aligned and one single motor. Similarly, it also allows to obtain a substantial economy on the cost price of such a machine, this by providing the advantage of allowing the grinding of two different kinds of coffee.

I claim:

1. A coffee mill comprising two grinding devices having cutting means, each device being formed of a fixed annular grinder and a rotary annular grinder which are mounted in opposition the one to the other, said grinding devices being coaxially vertically superposed so as to constitute upper and lower guiding devices, said rotary grinders of the two devices being rotated by a single axle connected to a single driving device with a double rotation direction, said cutting means of one of the pairs of grinders being oriented for a right hand cutting whereas those of the other pair of grinders being oriented for a left hand cutting, a feeding container mounted coaxially above the upper grinding device, said container being funnel-shaped and including an axial central tube providing access to the upper guiding device, and an annular space surrounding said axial central tube providing access to the lower guiding device.

2. The coffee mill according to claim 1, wherein the rotary grinders are each mounted on a holder fixed in rotation with the driving axle, and the fixed grinders are each mounted on a holder fixed with a body of the corresponding grinding device.

3. The coffee mill according to claim 2, wherein each grinding device body has a lateral opening for the discharge of ground coffee and a traversing axial opening, whose lower end is provided with a bearing cooperating with the driving axle.

4. The coffee mill according to claim 2, wherein each of the holders fixed in rotation is mounted vertically displaceable and cooperates with control means for adjusting the height of a fixed grinder with respect to a corresponding rotary grinder, each of said control means being accessible from outside the body of the respective grinding device.

5. The coffee mill according to claim 2, further including an intermediary body linking the bodies of the grinding devices.

6. The coffee mill according to claim 1, wherein the axial central tube is provided with a removable cover of conical shape, and the annular space is provided with a removable cover having the shape of a ring whose plane is radially inclined downwards and towards the inside of the axial central tube.

* * * * *